United States Patent [19]

Hastings

[11] Patent Number: 5,075,791
[45] Date of Patent: Dec. 24, 1991

[54] METHOD AND APPARATUS FOR ACHIEVING TWO-WAY LONG RANGE COMMUNICATION OVER AN OPTICAL FIBER

[75] Inventor: Mark W. Hastings, Weatherford, Tex.

[73] Assignee: Industrial Technology, Inc., Mineral Wells, Tex.

[21] Appl. No.: 549,602

[22] Filed: Jul. 9, 1990

[51] Int. Cl.$^5$ .................. H04J 14/08; H04B 10/00
[52] U.S. Cl. ............................ 359/135; 359/152; 359/164; 370/32
[58] Field of Search ............. 455/606, 607, 608, 612, 455/614; 379/443; 370/29, 109, 32, 4

[56] References Cited

U.S. PATENT DOCUMENTS

| | | | |
|---|---|---|---|
| 4,267,592 | 5/1981 | Craiglow | 370/109 |
| 4,450,319 | 5/1984 | Lucey | 455/614 |
| 4,525,835 | 6/1985 | Vance et al. | 370/29 |
| 4,709,416 | 11/1987 | Patterson | 455/607 |
| 4,844,573 | 7/1989 | Gillham et al. | 455/614 |

OTHER PUBLICATIONS

Electronics Review, vol. 52, No. 10, May 10, 1979.

*Primary Examiner*—Curtis Kuntz
*Assistant Examiner*—Kinfe-Michael Negash
*Attorney, Agent, or Firm*—James C. Fails; Geoffrey A. Mantooth

[57] ABSTRACT

The apparatus of the present invention includes an audio encoder and decoder, a memory, a transmitter and a receiver that are optically coupled to an optical fiber, and a controller. The audio encoder produces samples of an audio input at a regular rate. The samples are accumulated in the memory. When enough samples have been accumulated, the transmitter begins to transmit the accumulated samples over the optical fiber in a burst. After transmitting, the apparatus pauses long enough to allow reflections on the optical fiber to attenuate to an undetectable level. Then, the receiver is actuated to receive any incoming bursts of data, which are stored in memory until sent to the audio decoder.

5 Claims, 2 Drawing Sheets

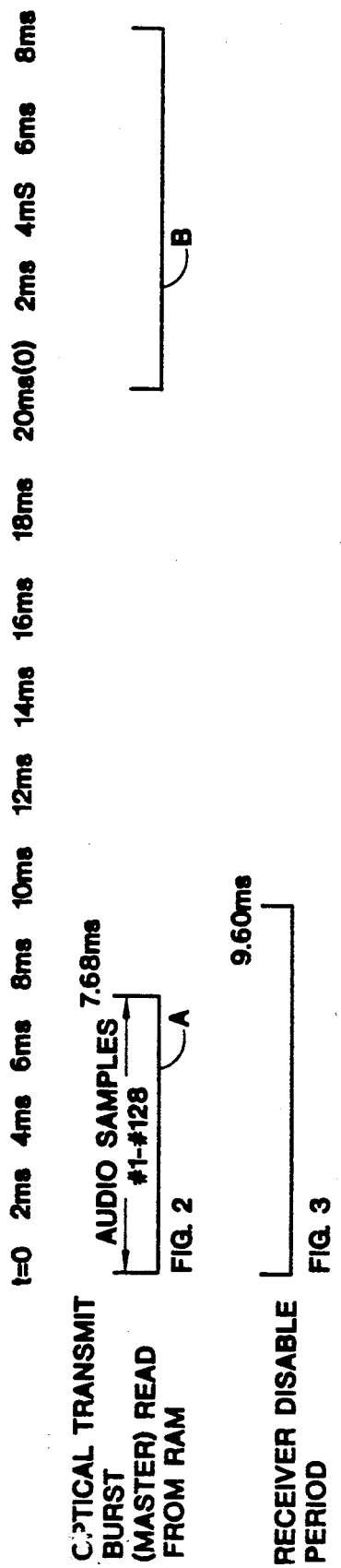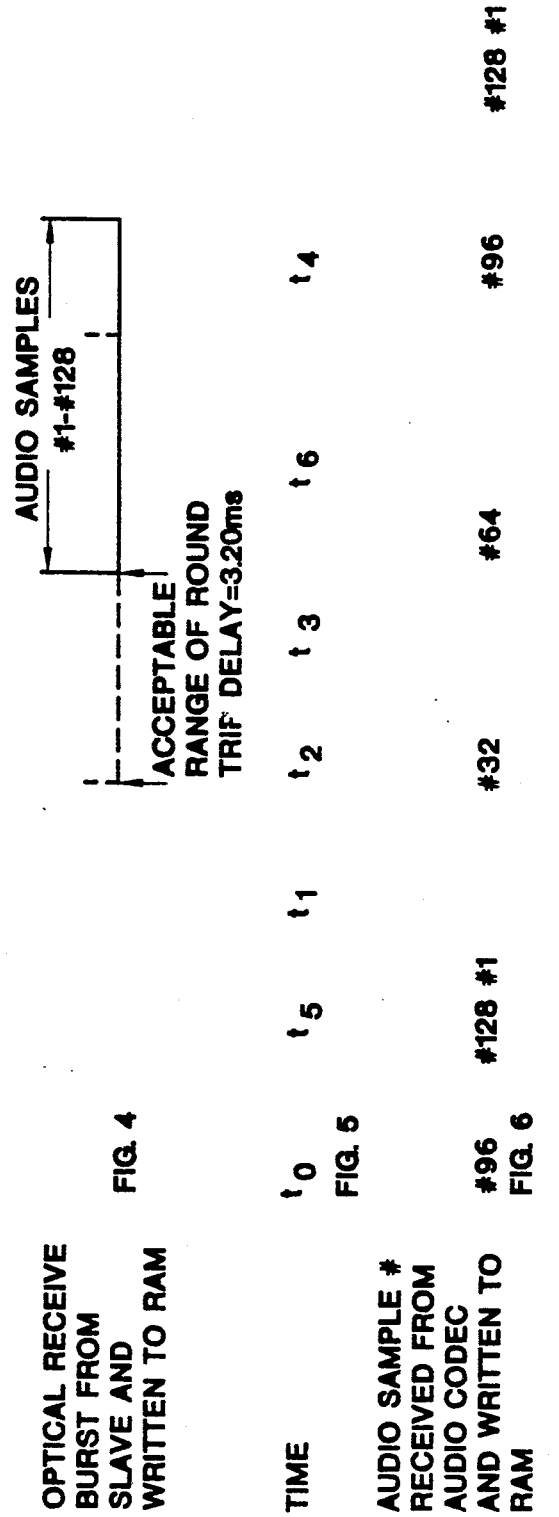

METHOD AND APPARATUS FOR ACHIEVING TWO-WAY LONG RANGE COMMUNICATION OVER AN OPTICAL FIBER

FIELD OF THE INVENTION

The present invention relates to methods and apparatuses for communicating over an optical fiber communications channel.

BACKGROUND OF THE INVENTION

The telecommunications industry is using more and more optical or light fibers in lieu of copper wire. Optical fibers have a high bandwidth, thereby allowing more information to be carried than with copper wire.

Telephone communications require full duplex communications, wherein each station on a communications channel can transmit and receive with apparent simultaneity. For example, an ordinary telephone provides full duplex communications; a user can talk and listen at the same time.

When servicing a fiber optic cable during installation or repair, field service personnel tap into the cable with a talk set. This enables communication between the field service personnel and the central switching station or with other field service personnel, and facilitates the work on the cable. The talk sets behave much like ordinary telephones in that full duplex communications are provided.

Prior art talk sets achieve full duplex communications in clumsy ways. One type of prior art talk set requires two optical fibers connected to each talk set; one fiber is for transmitting and the other fiber is for receiving. Such an arrangement necessitates an extra connection, as well as logistical work in ensuring that one talk set's transmit fiber is connected to the other talk set's receiving fiber. Another prior art talk set uses wavelength division multiplexing, wherein one talk set transmits information at one frequency and the other talk set transmits information at another frequency. Use of such dual frequency talk sets complicates interchanging talk sets. Operators must always ensure that their talk sets are compatible with their listeners' talk sets.

Besides achieving full duplex communication, there is a problem of achieving long range communication over optical fibers. Optical fibers typically impose a 0.3 db/km loss on a signal. At a distance of 100 km, this becomes about a 30 db loss. Prior art talk sets have proven to be unsatisfactory in communicating in this range. Furthermore, long range communication produces reflections of the transmitted light signal off of connectors, splices and the like. When using a single optical fiber and a single frequency to transmit and receive, the reflections from one's own talk set are easily mistaken for the incoming signals from the other talk set and thus interfere with communications.

SUMMARY OF THE INVENTION

It is an object of the present invention to provide interchangeable talk sets that can communicate with full duplex capability over a single optical fiber.

It is a further object of the present invention to provide a method and apparatus that can communicate on an optical fiber at long ranges and is unaffected by reflections produced on the optical fiber.

BRIEF DESCRIPTION OF THE DRAWINGS

FIGS. 2-5 are schematic diagrams illustrating the transmit and receive cycles of the present invention.

FIGS. 6 and 7 are schematic timing diagrams, illustrating the movement of data samples respectively to and from the audio encoder and decoder, with relation to FIGS. 2-5.

DESCRIPTION OF PREFERRED EMBODIMENT

Figure 1:
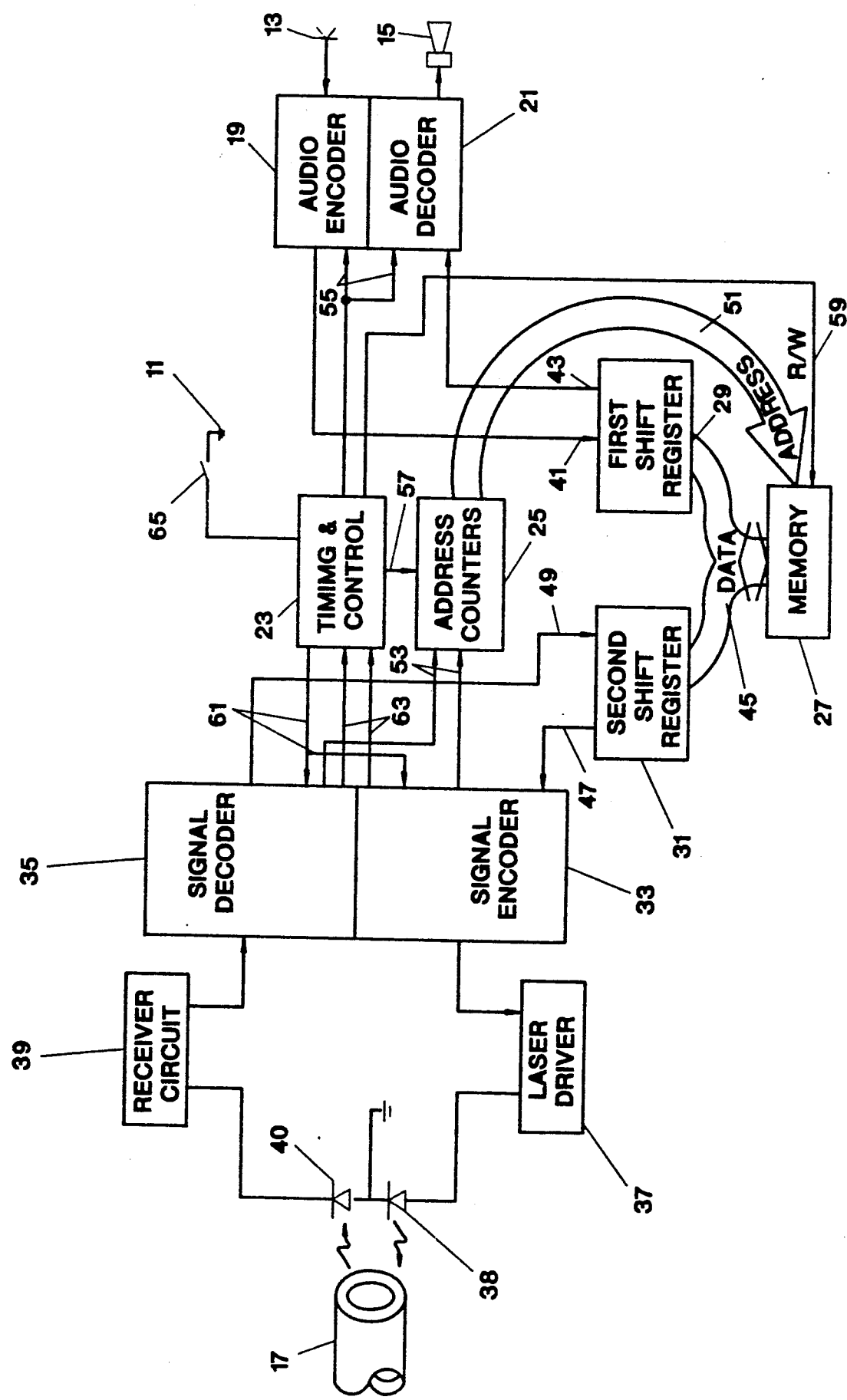
FIG. 1 is a schematic block diagram of the apparatus of the present invention, in accordance with a preferred embodiment.

In FIG. 1, there is shown a schematic block diagram of a communication apparatus 11 of the present invention, in accordance with a preferred embodiment. The apparatus 11 may be contained in a talk set of the type used by telephone service personnel. The apparatus 11 has a microphone 13 and speaker 15 for providing audio inputs and outputs respectively. The microphone 13 and speaker 15 are typically contained in a telephone hand set, whereby the operator can talk and listen just as if he were using an ordinary telephone.

The communication apparatus 11 is connected to an optical or light fiber 17. The optical fiber 17 typically forms part of a telecommunications network. Digital data, such as digitized audio information or digital computer data, is transmitted over the optical fiber 17 to selected parts of the network. In order to communicate, two apparatuses are used. Typically one apparatus is in the field, and the other is at the switching station. The two apparatuses are substantially similar to each other.

Besides the microphone 13 and the speaker 15, the communications apparatus 11 includes an audio encoder 19 and decoder 21 (collectively known as a "codec"), a controller 23, an address counter 25, memory 27, first and second shift registers 29, 31, a signal encoder 33 and decoder 35, a laser driver circuit 37 and a receiver circuit 39.

The audio codec 19, 21 is a conventional device, converting audio information to digitized code and vice versa. The microphone 13 is connected to the input of the audio encoder 19. The output of the audio encoder 19 is connected to a serial input 41 of the first shift register 29. The first shift register 29 has a serial output 43 that is connected to the input of the audio decoder 21. The output of the audio decoder 21 is connected to the speaker 15.

The first and second shift registers 29, 31 convert serial data to parallel data and vice versa, so as to interface with the memory 27. The first and second shift registers 29, 31 have parallel input/outputs that are connected to the data input/outputs 45 of the memory. The serial output 47 of the second shift register 31 is connected to the input of the signal encoder 33. The serial input 49 of the second shift register 31 is connected to the output of the signal decoder 35.

The address counters 25 provide the address of where to read and write data to the memory 27. The address counters 25 are connected to the address inputs 51 of the memory 27. In the preferred embodiment, two address counters 25 are used. One address counter is used for read/write operations to the audio encoder and decoder 19, 21, while the other address counter is used for read/write operations to the signal encoder and decoder 33, 35. The address counters 25 have clock inputs 53 that are connected to the clock outputs of the signal encoder and decoder 33, 35. The memory 27 is made up of conventional RAM.

The signal encoder and decoder 33, 35 is conventional and converts the data between the audio encoder/decoder and a code that is suitable for transmitting over the optical fiber. The output of the signal encoder 33 is connected to the laser driver 37. The laser driver 37 drives a laser diode 38 that is optically connected to the optical fiber 17. The receiver circuit 39 is connected to a photo diode 40 that is optically connected to the optical fiber 17. The receiver circuit 39 is connected to the input of the signal decoder 35. The laser driver 37 and the receiver circuit 39 are conventional.

The controller 23 controls the flow of data between the audio encoder and decoder 19, 21, the signal encoder and decoder 33, 35 and the memory 27. The controller 23 has a clock that is used for timing operations. The controller 23 has clock outputs 55 that are connected to the clock inputs of the audio encoder and decoder 19, 21. The controller 23, through the clock outputs 55, controls the sampling rate of the audio encoder 19 and the reconstruction rate of the audio decoder 21. The controller 23 has a control line 57 to the address counter 25 and a read/write line 59 to the memory 27, wherein the operation of the memory is controlled. Clock lines 61, 63 between the controller 23 and the signal encoder and decoder provide coordination in the movement of data samples between the memory 27 and the signal encoder and decoder 33, 35.

The operation of the communication apparatus 11 will now be described. As described above, two apparatuses 11 are used to communicate with each other. For simplicity, only one apparatus will be described. The audio encoder 19 digitizes an audio input from the microphone 13. As part of the digitizing process, the audio encoder 19 produces one digitized sample at fixed intervals of time, on a regular basis. Each individual sample could be sent over the optical fiber 17 as soon as it is produced. However, after each transmission, the apparatus needs to pause in order to receive any incoming data from the other apparatus. This transmit-pause (and receive) arrangement is necessary because the transmitting and receiving operations are occurring on a single optical fiber at the same frequencies. As the apparatus is pausing to receive incoming signals from the other apparatus, it is susceptible to receiving reflections of its own transmitted signal. Each transmission may produce reflections off of connectors, splices, etc. on the optical fiber. These reflections travel back and forth to the transmitting apparatus, where they appear as incoming data. This is particularly true when attempting to communicate over long distances, where the number of reflective surfaces on an optical fiber is likely to be greater and the propagation times of the optical signals are longer.

In order to avoid the confusion and loss of communication caused by receiving one's own transmission, the apparatus of the present invention stores a number of samples and then transmits them in one burst, instead of sending individual samples one at a time over the optical fiber. The apparatus then waits a sufficient period of time after the transmission of the burst to allow any reflections from the transmitted burst to become attenuated to a level below the sensitivity threshold of the receiver circuit 39. Then, the apparatus 11 activates the receiver circuit 39 to listen for any incoming bursts of data. After a predetermined period of time, the cycle repeats itself.

In operation, the audio encoder 19 digitizes the audio input from the microphone 13. The audio encoder 19 operates to produce a data sample at regular intervals of time. Each digitized sample from the audio encoder 13 arrives at the first shift register 29 where it is converted from serial to parallel form. The parallel data sample is then stored in memory 27. The memory address of each data sample is determined by the address counter 25. The address counter 25 increments the address of the memory 27 so as to prevent overwriting of each data sample before the samples are transmitted.

When enough data samples from the audio encoder 19 have been accumulated in the memory 27, the data samples are then moved to the laser driver 39 for transmission over the optical fibers 17. The data is moved, one sample at a time, from the memory 27 through the second shift register 31 and the signal encoder 33. The controller 23 controls the movement of data out of the memory 27 by the read/write line 59. The second shift register 31 converts the data from parallel to serial. The signal encoder 33 encodes the data to a form suitable for transmission (in the preferred embodiment, Manchester coding is used). The laser driver 37 transmits the data samples over the optical fiber.

Each data sample is composed of plural bits. The bits are transmitted serially over the optical fiber. The transmission rate is controlled by the controller 23 via the clock line 61 to the signal encoder 33. The transmission rate is slowed down to increase sensitivity, a desirable feature in long range communication. Instead of transmitting bits that are one microsecond long, the apparatus transmits bits that are three microseconds long, providing a threefold increase in sensitivity.

The data samples are transmitted in a burst so that the first data sample is transmitted in a serial format, followed by the second data sample, followed by the third data sample and so on, until the entire burst has been transmitted.

Likewise, data transmitted by a second apparatus on the optical fiber is received from the optical fiber 17 in a burst. The receiver circuit 39 receives a first received data sample, followed by a second received data sample and so on. The received data samples are sent sequentially to the signal decoder 35, where the samples are decoded from the transmission format to a format understandable by the audio decoder 21. The received data samples are then sent to the second shift register 31 where they are converted from serial to parallel, and then on to the memory 27. The address counter 25 controls the addresses of the stored received data samples. The received data samples are stored at different addresses than the transmitted data samples. Next, the received data samples are moved out of memory 27 through the first shift register 29, and to the audio decoder 21 and the speaker 17.

Referring to FIGS. 2-5, which show timing diagrams of the various components in the communications apparatus 11, there is shown the transmit and receive cycles of the apparatus. The transmit burst is initiated at time $t_0$ and is maintained until time $t_1$, where it is terminated. After time $t_2$, the receiver circuit 39 is enabled, wherein data arriving on the optical fiber 17 is received by the receiver circuit 39. A delay period of time $t_2-t_1$ is provided wherein the receiver is disabled after the end of a transmission, thereby preventing reception of any incoming signals on the optical fiber. This delay allows any reflections of the burst that was transmitted during time $t_1$-$t_0$ to attenuate to a level that is below the threshold of the receiver sensitivity. Optical fibers typically attenuate signals at about 0.3 db per km. Thus, any reflected signals that are propagating along the fiber will become more and more attenuated on each trip along the fiber.

The receiver circuit 39 is enabled from time $t_4$-$t_2$. The window of enablement is longer than the length of the actual received burst, which length is time $t_4$-$t_3$. Thus, an extra amount of time $t_3$-$t_2$ is provided for reception. This time ($t_3$-$t_2$) is the acceptable range of the round trip time involved when communicating between first and second communications apparatuses. The round trip time includes propagation delays along the optical fiber and switching times at the second apparatus, wherein the second apparatus changes from the receiving mode to the transmitting mode.

Thus, the apparatus transmits a burst of data between times $t_0$ and $t_1$, pauses between times $t_1$ and $t_2$ to allow reflections to die down, and turns on its receiver circuit from times $t_2$ to $t_4$. At time $t_4$, the cycles repeat.

The second apparatus is slaved to the first apparatus, which initiates transmissions, so as to coordinate the transmit and receive operations. Such coordination is required because a single optical fiber is utilized. The first apparatus begins transmissions when the operator presses a call button 65. This activates the signal encoder 33, via the controller 23 to transmit a call signal. When the call signal is received by the second apparatus, a ringing tone will be produced, indicating an incoming call to the operator. The call signal also "slaves" the second apparatus to the first apparatus, wherein the second apparatus only transmits a burst after receipt of a burst from the master station. When the second apparatus receives an incoming burst, the controller 23 synchronizes its clock to the clock of the master or first apparatus. The clock of the second apparatus is set to about 11 milliseconds to put the second apparatus in the receiving mode. The second apparatus hesitates for a short period of time after receiving the burst before transmitting its burst, in order to wait until the receiver in the master apparatus is enabled.

Although the data is transmitted and received over the optical fiber in bursts, the audio encoder and decoder 19, 21 operate on a regular basis. The audio encoder 19 produces digital samples on a periodic basis, which is determined by the sampling rate. Thus, data samples must be regularly received (at regular periodic intervals of time) from the audio encoder 19 and be regularly provided to the audio decoder 21. The memory 27 is used to accumulate or store data samples from the audio encoder 19 until it is time to transmit a burst. In the preferred embodiment, where a burst includes 128 data samples, the apparatus 11 begins transmitting the first samples of a data burst before receiving the last samples of that burst in memory 27 from the audio encoder 19. Thus, referring to FIGS. 1, 5–6, sample #1 is stored in memory 27 during the previous transmit cycle, which occurred before time $t_0$. In fact, samples #1–#95 are stored in memory before time $t_0$. At time $t_0$, the apparatus begins to transmit those samples in a burst A, beginning with sample #1, and followed by sample #2, sample #3, and so on. Samples #96–#128 are stored during the first portion of the burst A (that is from time $t_0$ to time $t_5$). Thus, by the time sample #95 is being transmitted, samples #96 et seq. are already stored in memory. This ensures a smooth flow of data from the regularly operating audio encoder 19 to the intermittingly operating laser driver 37.

After sample #128 has been stored, sample #1 of the next data burst B is stored. Samples #1–#95 of the next data burst B are stored between times $t_2$ and $t_4$. Samples #96–#128 are stored after time $t_4$.

The switching speeds of the components in the apparatus 11 are of course much faster than the sampling rate of the audio encoder. This allows data to be transmitted in both directions through the apparatus. Thus, during the delay time between samples from the audio encoder 19, received samples from the receiver circuit 39 are being stored in memory 27 and then provided to the audio decoder 21. Data samples are provided on a regular periodic basis to the audio decoder from the memory. As in the case of transmitting a burst, in receiving a burst, the first samples of a burst are sent to the audio decoder 21 before the last samples have been received from the optical fiber 17. Referring to FIGS. 4, 5 and 7, the first samples begin to be received at time $t_3$ and are stored in memory upon reception. From time $t_3$ to time $t_4$, the received data samples are stored in the memory 27. Beginning at time $t_6$, the received data samples are provided to the audio decoder 21 from memory 27 on a regular periodic basis. Data samples continue to be provided to the audio decoder through the next transmit cycle and even into the first portions of the next receive cycle. Because the transmit and receive cycles are periodic, data is received from and supplied to the audio encoder and decoder on a continuous basis, without interruption between sample #128 and sample #1 of the next burst.

In the preferred embodiment, all of the #1 samples that are received from the audio encoder 19 are stored in the same memory address in the memory 27. Likewise, all of the #2 samples are stored in the same memory address, and so on. This simplifies the operation of the address counter 25. Furthermore, the data sample in a particular address is moved either to the optical fiber 17 or the audio decoder 21 before a new data sample is written to that address, in order to avoid overwriting unmoved data.

The apparatus of the present invention provides for long range communication over a single optical fiber and using a single frequency to both transmit and receive. By delaying reception for a predetermined period of time after a transmission, the apparatus allows reflections produced by the transmission to attenuate to an undetectable level. Thus, the transmitting apparatus does not receive its own reflected data, providing reliable communications between two apparatuses.

The apparatus of the present invention provides full duplex communication over long ranges by compressing the data to be transmitted and received into packets or bursts. Each burst is made up of a sequence of multiple data samples obtained from the audio encoder. The data samples in a burst have been compressed to remove unnecessary time delays from between individual data samples. Thus, bursts of data samples are transmitted with large delays interposed between the bursts instead of interposed between individual data samples. The large delays between transmitted bursts are used to allow reflections to become attenuated and to receive any incoming bursts of data.

Furthermore, long range communication is enhanced with the present invention because the method of transmitting bursts of data provides for better sensitivity. With optical signals, the longer the duration of the signal, the easier it is to receive because more photons are utilized. Longer duration signals are achieved by slowing the transmission rate. But, when the transmission rate is slowed in prior art devices, a communications bottleneck occurs because the audio encoder generates data faster than it can be transmitted over the optical fiber. The present invention allows a slower transmission rate because of the efficiency in removing time delays between data samples and transmitting multiple samples in a burst, followed by a long delay for receiving.

With the present invention, the communication apparatuses are interchangeable. Therefore, one apparatus can easily be substituted for another apparatus without concern for matching frequencies with the like as with some prior art devices.

The foregoing disclosure and the showing made in the drawings are merely illustrative of the principles of this invention and are not to be interpreted in a limiting sense.

I claim:

1. A method of communicating at long ranges over an optical fiber, comprising the steps of:
   a) producing digitized samples, said samples containing information which is to be communicated over said optical fiber;
   b) transmitting bursts of samples over said optical fiber, each of said bursts comprising plural samples;
   c) after transmitting each burst, waiting for a predetermined period of time to allow reflections caused by transmitting to attenuate;
   d) after waiting for said predetermined period of time, becoming receptive to any incoming bursts of samples on said optical fiber;
   e) repeating steps a)-d).

2. A method of communicating at long ranges over a light fiber, comprising the steps of:
   a) providing transceiver means for transmitting and receiving light signals from said light fiber;
   b) receiving data which is to be transmitted over said light fiber from data source means and storing said data in memory means;
   c) storing said data in said memory means so as to accumulate a fist quantity of said data in said memory means;
   d) transmitting said accumulated first quantity of data over said light fiber with said transceiver means;
   e) waiting for a first predetermined period of time after transmitting said first quantity of data and then receiving signals arriving at said transceiver means from said light fiber, said first predetermined period of time being selected so as to allow reflections on said light fiber to be minimized, said reflections being caused by transmitting said first quantity of data;
   f) ignoring any signals arriving at said transceiver means from said light fiber after a second predetermined period of time, said second period of time occurring after said first period of time, said second predetermined period of time being selected so as to allow the reception of a second quantity of data from said light fiber;
   g) continuing to store data received from said data source means in said memory means so as to accumulate a third quantity of data;
   h) after said second predetermined period of time, transmitting said third quantity of data over said light fiber with said transceiver means;
   i) repeating steps e)-h) for subsequent quantities of data.

3. A method of communicating at long ranges over an optical fiber, comprising the steps of:
   a) producing digital samples at a sampling rate such that there is a time delay between successive samples;
   b) storing said samples in memory means;
   c) transmitting said samples over said optical fiber in bursts, each of said bursts comprising plural samples, said samples in a burst transmitted without said sampling time delay between successive samples;
   d) transmitting said samples with a slowed rate of transmission, wherein the lengths of bits in said samples is temporally increased so as to improve the sensitivity of said communication.

4. An apparatus for long range communication over an optical fiber, comprising:
   a) audio input and output means for providing respective audio input and output signals;
   b) audio encoding means and audio decoding means connected respectively with said audio input and output means, said audio encoding means for digitizing audio signals from said audio input means, said audio decoding means for converting received samples to audio signals;
   c) storage means for storing digitized samples, said storage means being connected with said audio encoding means and decoding means;
   d) transmitter means for transmitting samples over an optical fiber, said transmitter means being connected with said storage means and being adapted to be connected with said optical fiber;
   e) receiver means for receiving samples from said optical fiber, said receiver means being connected with said storage means and being adapted to be connected with said optical fiber;
   f) controller means for controlling the flow of samples through said apparatus, said controller means being connected with said storage means, said transmitter means and said receiver means, said controller means providing for the accumulation of samples from said audio encoder means in said storage means and the transmission of said accumulated samples in a burst by said transmitter means, said controller means disabling said receiver means after the transmission of said burst for a predetermined period of time so as to allow the attenuation of reflections on said optical fiber from said transmitted burst when said transmitter means and said receiver means are connected to said optical fiber, said controller means activating said receiver means after said predetermined length of time so that said receiver means can receive an incoming burst of samples from said optical fiber when said receiver means is connected to said optical fiber, said controller means providing for the accumulation of said received samples in said storage means and for the movement of said received samples to said audio decoder means.

5. A method of communicating at long ranges over an optical fiber, comprising the steps of:
   a) producing digital samples at a sampling rate such that there is a time delay between successive samples;
   b) storing said samples in memory means;

c) transmitting said samples over said optical fiber in bursts, each of said bursts comprising plural samples, said samples in a burst transmitted without said sampling time delay between successive samples;

d) transmitting said samples with a slowed rate of transmission, wherein the lengths of bits in said samples is temporally increased so as to improve the sensitivity of said communication;

e) after transmitting each burst, waiting for a predetermined period of time to allow reflections caused by transmitting to attenuate;

f) after waiting for said predetermined period of time, becoming receptive to any incoming bursts of samples on said optical fiber.

* * * * *